United States Patent
Odenwald, Jr. et al.

(10) Patent No.: US 7,228,361 B2
(45) Date of Patent: Jun. 5, 2007

(54) COMMUNICATIONS METHOD WITHIN AN ARBITRATED LOOP FIBRE CHANNEL NETWORK

(75) Inventors: Louis H. Odenwald, Jr., Wichita, KS (US); Steve R. Schremmer, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 933 days.

(21) Appl. No.: 10/183,896

(22) Filed: Jun. 26, 2002

(65) Prior Publication Data

US 2004/0003124 A1    Jan. 1, 2004

(51) Int. Cl.
*G06F 15/16* (2006.01)

(52) U.S. Cl. .................. 709/249; 709/203; 709/211

(58) Field of Classification Search .............. 709/203, 709/249
See application file for complete search history.

(56) References Cited

U.S. PATENT DOCUMENTS 6,209,023 B1 *  3/2001  Dimitroff et al. ........... 709/211
6,430,645 B1 *  8/2002  Basham ...................... 710/305

* cited by examiner

*Primary Examiner*—Yves Dalencourt
(74) *Attorney, Agent, or Firm*—Suiter Swantz PC LLO

(57) ABSTRACT

A system and method are described for increasing performance of operations implemented in a storage system utilizing fibre channel, such as by enabling full duplex opens when a JBOD/bridge is involved. In an aspect of the present invention, a method of performing a full duplex open in a fibre channel network having an initiator and a bridge may include initiating an open by the initiator with the bridge. The bridge has a primary physical address and an alias physical address. The alias physical address represents a target device communicatively coupled to the bridge, wherein the open is initiated utilizing the primary physical address. The initiator communicates with the target device.

19 Claims, 4 Drawing Sheets

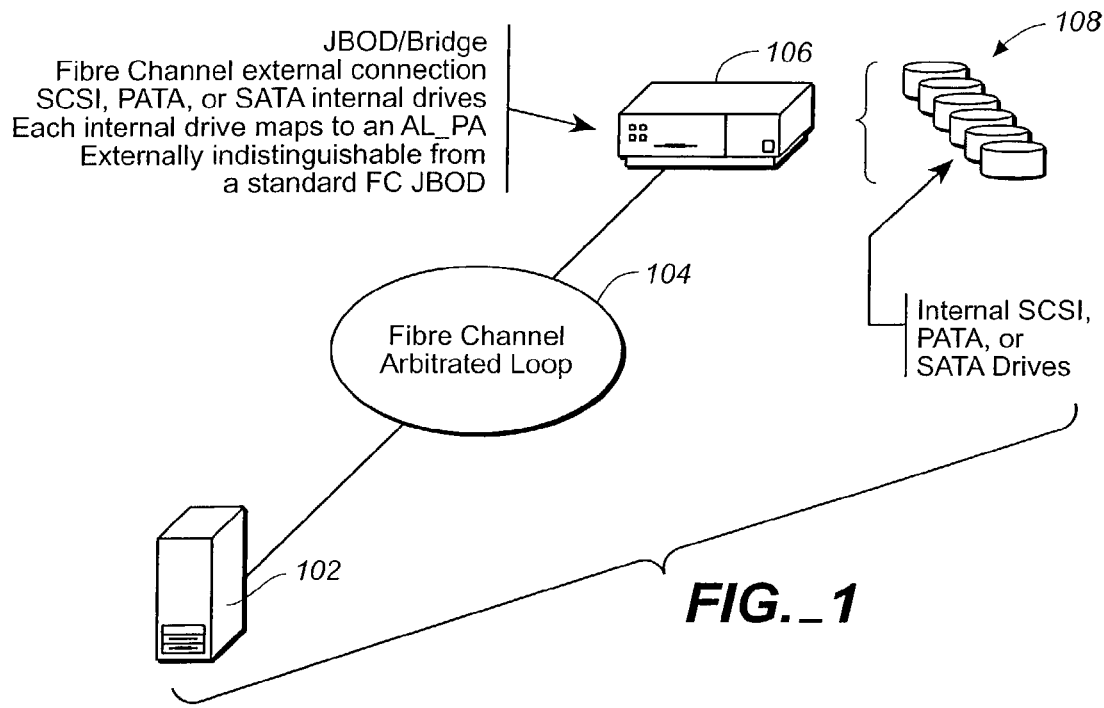
FIG._1
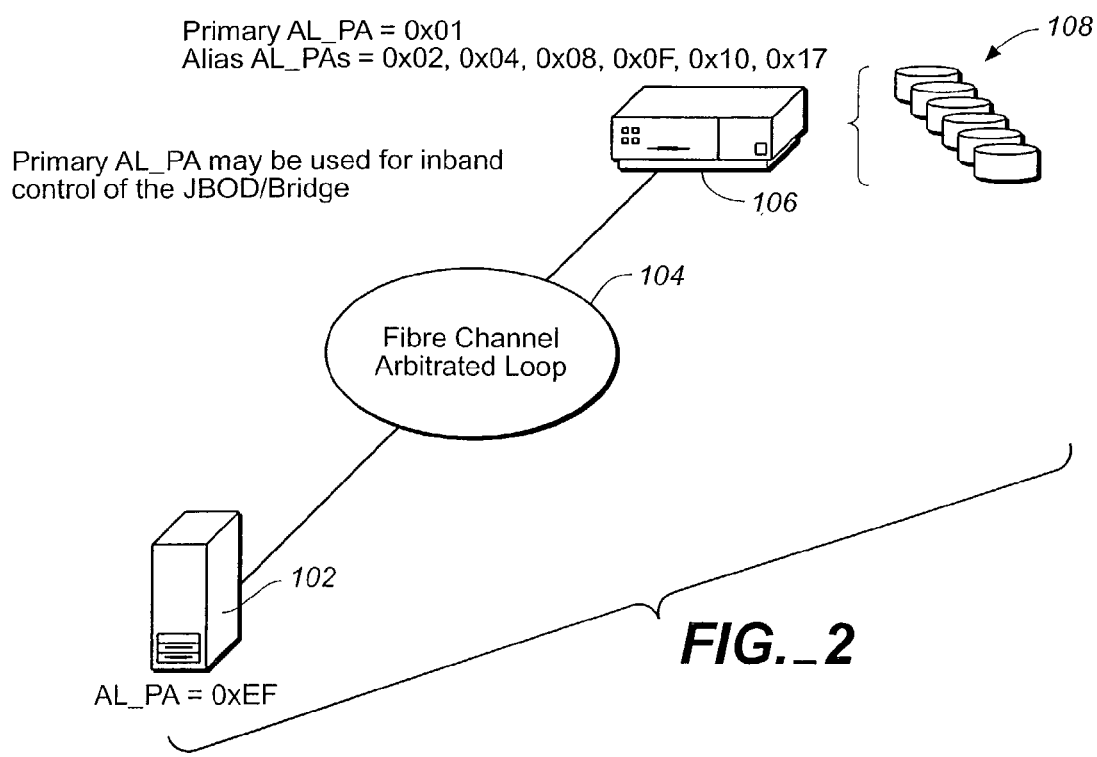
FIG._2

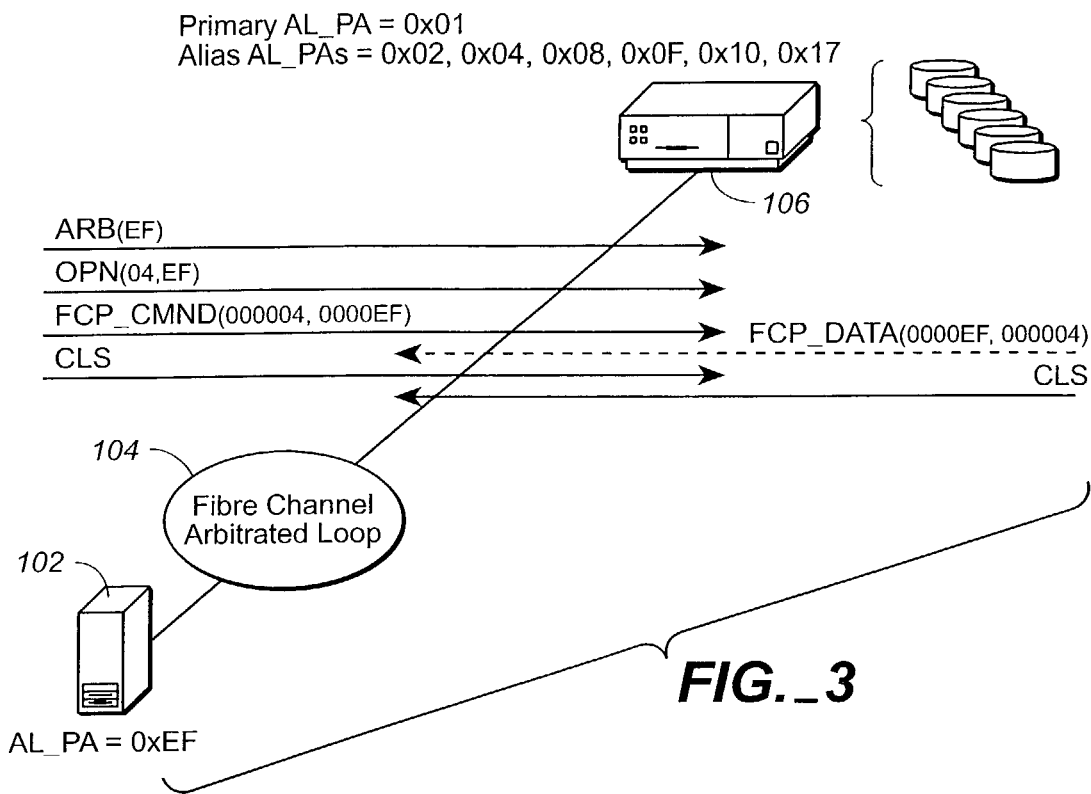
FIG._3
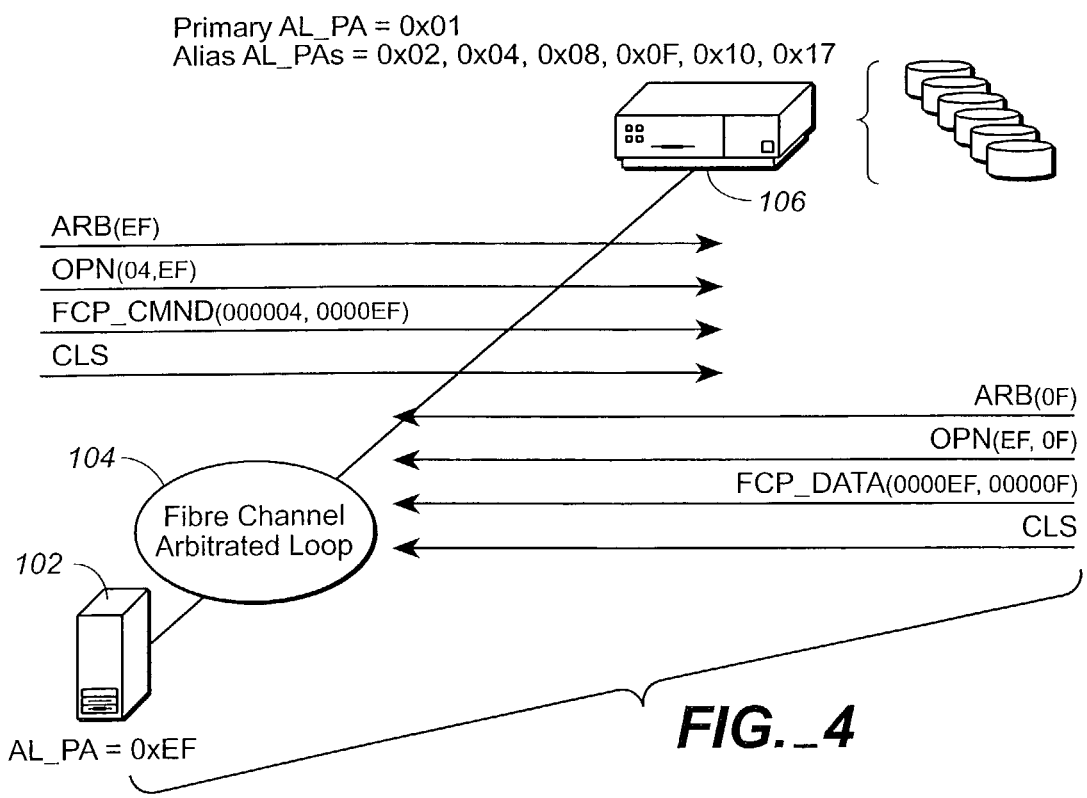
FIG._4

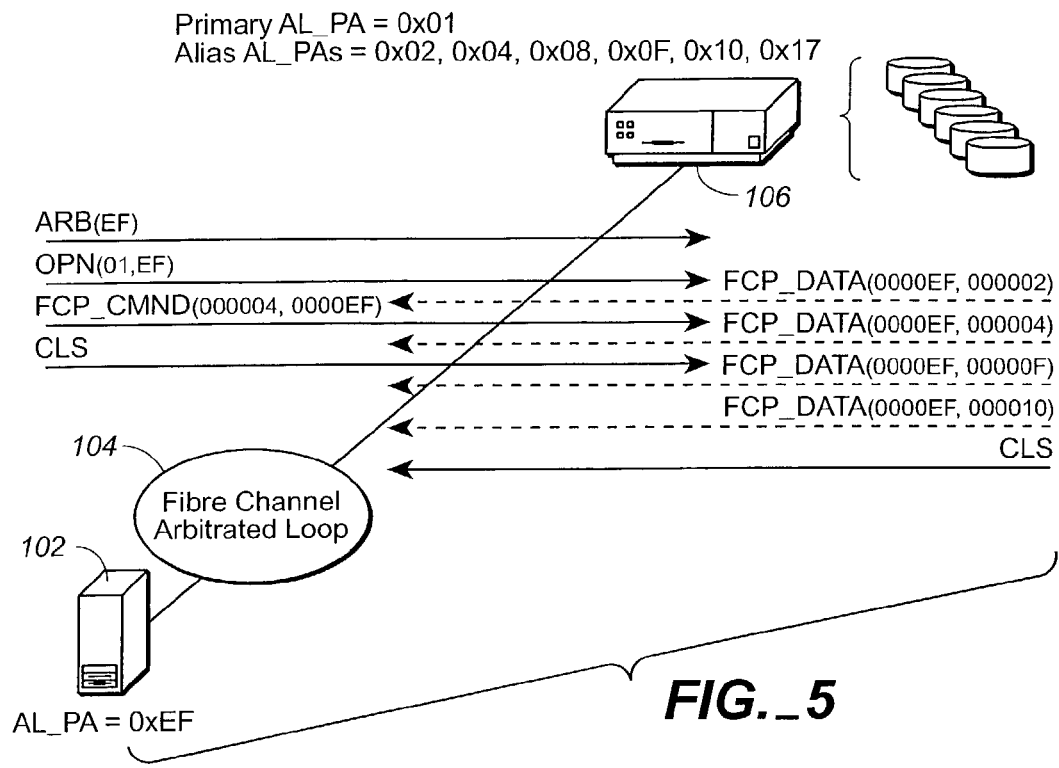
FIG._5
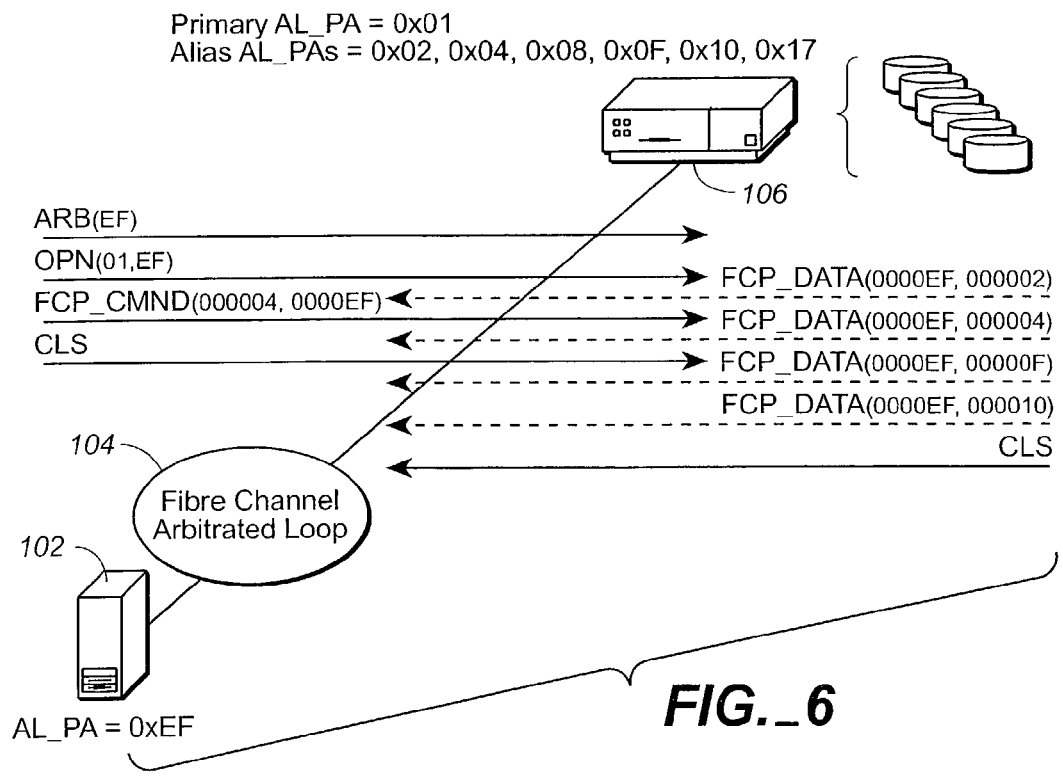
FIG._6

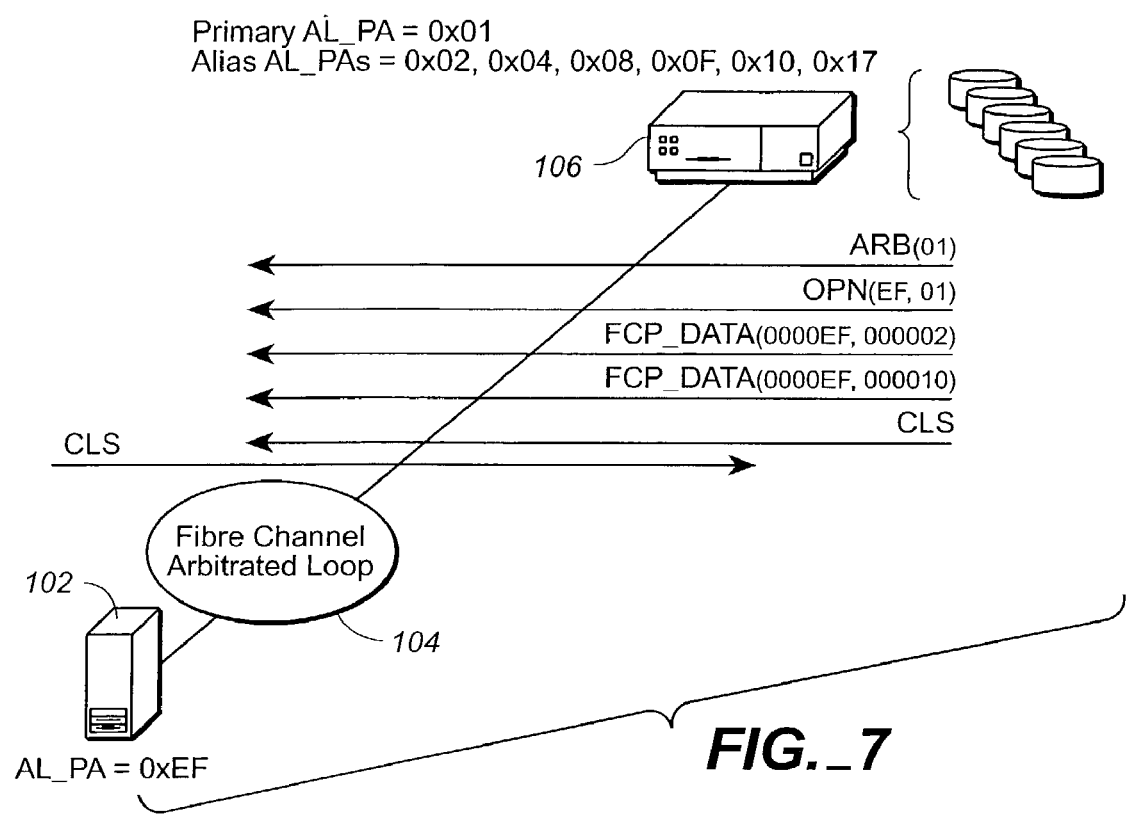
FIG._7

COMMUNICATIONS METHOD WITHIN AN ARBITRATED LOOP FIBRE CHANNEL NETWORK

FIELD OF THE INVENTION

The present invention generally relates to the field electronic data storage, and particularly to a system and method for providing full duplex aliases.

BACKGROUND OF THE INVENTION

The storage of electronic data is one of the most important aspects in modem business practice as businesses increasingly rely on efficient and reliable access to necessary data. Because of the importance of this data, a variety of methods and systems have been developed to provide redundant and efficient data access to ensure the availability of the data.

However, businesses are confronted with balancing service quality, such as access speed in writing and retrieving data, robustness of the storage devices, and the like, with cost of maintaining and purchasing data storage systems. Although the cost of storage devices continues to decrease, the amount of data needed to be stored has increased, which in some instances has outstripped potential cost savings as customers need larger amounts of storage and quicker access to data. Further, the costs of maintaining data storage has increased as larger and more complex systems require better trained and greater number of IT personnel.

Fibre channel is a computer communications protocol which offers increased information transfer capabilities over pre-existing protocols. Thus, fibre channel has greatly benefited electronic storage. However, fibre channel devices are generally more expensive than legacy devices and require adapter cards and the like for connectivity utilizing legacy devices.

Therefore, it would be desirable to provide a system and method for increasing performance of devices utilizing fibre channel.

SUMMARY OF THE INVENTION

Accordingly, the present invention is directed to a system and method for increasing performance of operations implemented in a storage system utilizing fibre channel, such as by enabling full duplex opens when a JBOD/bridge is involved. In an aspect of the present invention, a method of performing a full duplex open in a fibre channel network having an initiator and a bridge includes initiating an open by the initiator with the bridge. The bridge has a primary physical address and an alias physical address. The alias physical address represents a target device communicatively coupled to the bridge, wherein the open is initiated utilizing the primary physical address. The initiator communicates with the target device.

In an additional aspect of the present invention, a system includes a host suitable for communicating utilizing fibre channel and a bridge having a primary arbitrated loop physical address and at least one alias arbitrated loop physical address which corresponds to a device. The bridge is communicatively coupled to the host through an arbitrated loop fibre channel network. A full duplex open is initiated by the host with the bridge utilizing the primary arbitrated loop physical address.

In a further aspect of the present invention, a method of performing a full duplex open in a fibre channel arbitrated loop having an initiator and a bridge includes initiating an open by the initiator with the bridge. The bridge has a primary arbitrated loop physical address and at least two alias arbitrated loop physical addresses. The alias arbitrated loop physical addresses represent at least two target devices communicatively coupled to the bridge. The open is initiated utilizing the primary arbitrated loop physical address thereby enabling communication with the initiator by the at least two target devices.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 1 is an illustration of an exemplary embodiment of the present invention wherein a network operable to employ the present invention is shown;

FIG. 2 is an illustration of an exemplary embodiment of the present invention wherein use of alias AL_PAs in a JBOD/bridge in a fibre channel network is shown;

FIG. 3 is an illustration of a fibre channel network wherein arbitration for a loop and utilization of a full duplex open functionality is shown;

FIG. 4 is an illustration wherein a full duplex open and use by an additional AL_PA of a full duplex open is shown;

FIG. 5 is an illustration of an exemplary embodiment of the present invention wherein a full duplex open utilizing a primary AL_PA and alias AL_PAs is shown to utilize the full functionality of the full duplex open;

FIG. 6 is an illustration of an exemplary embodiment of the present invention wherein an open is directed at a JBOD/bridge primary AL_PA, with subsequent operations addressed to a target's alias AL_PA; and FIG. 7 is an illustration of an exemplary embodiment of the present invention wherein detection of alias AL_PAs is shown.

DETAILED DESCRIPTION OF THE INVENTION

Reference will now be made in detail to the presently preferred embodiments of the invention, examples of which are illustrated in the accompanying drawings.

Referring generally now to FIGS. 1 through 7, exemplary embodiments of the present invention are shown. The present invention provides a system and method which allows for increased communication efficiency, and therefore increased performance of a network. Previously, when communicating between a host bus adapter (HBA) and a bridge, full duplex opens were initiated, but not fully realized to full functionality. However, through use of the present invention, greater advantage is taken of full duplex opens, which increases efficiency of the network, and therefore increases performance of components of the system utilizing the present invention.

Referring now to FIG. 1, an exemplary embodiment of the present invention is shown where a system including a host, fibre channel, bridge and JBODs operable to employ the present invention is shown.

A host, such as an information handling system 102, which may include a server, desktop computer, laptop computer, information appliance and the like, is provided. The information handling system 102 may include a variety of electronic devices for providing desired functionality to a user.

A host bus adapter (HBA) is included with the information handling system 102 to enable communication between a fibre channel network 104 and the internal communications of the host. For instance, host bus adapters provide an interface between an internal bus of a host, such as a server having peripheral component interconnect (PCI) and the like, with an external network, such as a fibre channel (FC) network.

A bridge 106 is also included which allows devices with other network technologies to coexist with fibre channel devices. For example, just a bunch of disks 108 (JBOD) may be communicatively connected to the bridge. The JBODs 108 may employ a variety of communication protocols, such as small computer system interconnect (SCSI), parallel advanced technology attachment (PATA), serial advanced technology attachment (SATA), and the like as contemplated by a person of ordinary skill in the art. Additionally, the disks and protocols used may be selected for a design based on performance and cost-effectiveness, such as by selecting PATA and SATA drives, which may be less expensive than FC or SCSI drives, but have reduced performance.

In this instance, the fibre channel network 104 is configured as an arbitrated loop. An arbitrated loop is a prevailing topology for fibre channel. An arbitrated loop allows a plurality of ports, such as 126 ports plus a fibre channel connection, in a single network without needing a fabric switch. When a device is ready to transmit data, it first must arbitrate and gain control of the loop. For instance, an arbitrate (ARBx) primitive signal, where x is the arbitrated loop physical address (AL_PA) of the device may be transmitted. Once a device receives its own ARBx primitive signal, the device now has control of the loop and may communicate with other devices by transmitting an Open (OPN) Primitive Signal to a destination device. Once this happens, there exists what may be thought of as "point-to-point" communication between the two devices, with other devices in between repeating the data.

If more than one device on the Loop is arbitrating at the same time, the x values of the ARB Primitive Signals are compared. When an arbitrating device receives another device's ARBx, the ARBx with the numerically lower AL_PA is forwarded, while the ARBx with the numerically higher AL_PA is blocked. Thus, the device with the lower AL_PA will gain control of the loop first. Once that device relinquishes control of the loop, the other device may have a chance at gaining control.

Through use of the bridge 106, each internal drive of the JBOD maps to an AL_PA and is externally indistinguishable from a standard FC JBOD. Therefore, for use of JBOD/bridge, each drive may be mapped to a virtual FC target with a unique world wide name (WWN) and PortID. Therefore, the fibre channel network 104 views the loop as having eight NL_Ports, although in actuality only two NL_Ports (0xEF of the information handling system 102 & 0x01 of the bridge 106) are provided, as shown in FIG. 2.

In typical loop behavior, the information handling system 102, utilizing NL_Port 0xEF, may arbitrate for the loop and send a full duplex open followed by a FCP command and a close to port 0x04 of the bridge 106, which is an alias AL_PA. If NL_Port 0x04 has data to send to 0xEF, the port may take advantage of the full duplex open and send its data as traffic during the same loop tenancy, as shown in FIG. 3.

However, as shown in FIG. 4, if 0x04 does not have data to send to 0xEF, but another port provided by the bridge 106 does, such as Port 0x0F, this port is not allowed to take advantage of the full duplex open existing between 0xEF and 0x04. Therefore, any other port of the bridge 106 must wait until the existing loop tenancy is finished, and then arbitrate for the network 104 itself, send an open, and the like as previously discussed. Therefore, inefficiency is encountered, because 0x04 and 0x0F are both aliases residing behind the same primary AL_PA, 0x01. However, by utilizing the present invention, the primary AL_PA may be utilized to enable full duplex of all the "ports" of the bridge 106.

For instance, as shown in FIG. 5, instead of generating full duplex opens to the alias AL_PA, port 0xEF of the information handling system 102 sends the opens to the primary AL_PA of the bridge 106 instead, but the FCP commands are still addressed to the alias NL_Port (0x000004). It should be noted that only two "real" NL_Ports are provided on this loop, the information handling system 102 AL_PA of 0xEF and the primary AL_PA of the bridge 106 0x01. It should be apparent that varying number of ports may be utilized without departing from the spirit and scope of the present invention.

In this way, the system may take greater advantage of the full duplex open. For instance, more bi-directional data traffic may be provided and fewer arbitration cycles performed. This in turn provides greater performance of the system as a whole.

Referring now to FIG. 6, an exemplary embodiment of the present invention is shown wherein a full duplex open is performed to a primary AL_PA with subsequent operations performed to alias NL_Ports. When initiating a full duplex open, the information handling system 102 first directs an open at the bridge's primary AL_PA. However, the subsequent FCP traffic is addressed to a target's alias NL_Port. Additionally, the targets may use the bridge's primary AL_PA when sending FCP traffic back to the initiator, in this instance, the information handling system 102. In this way, the full functionality of the full duplex open may be utilized, and still provide data transmission between target and initiator directly.

Referring now to FIG. 7, an exemplary embodiment of the present invention is shown wherein a determination of aliased targets is made by a host. As stated previously, generally, alias AL_PAs appear as actual AL_PAs when viewed from a fibre channel network 104. Therefore, a host, such as an information handling system 102, may determine the presence of the alias AL_PA to implement the full duplex open of the present invention.

For instance, the bridge 106 may be configured so that it uses a primary AL_PA when generating full duplex opens. The information handling system 102 may initially initiate the full duplex open in the traditional manner, such as by utilizing alias AL_PAs. However, the information handling system 102 may determine the presence of a bridge 106 utilizing this feature by receiving traffic from the bridge 106 in which there is a mismatch between the full duplex open's AL_PAs and the S_ID associated with it. When encountering such a mismatch, the information handling system 102 may then implement a full duplex open of the present invention as previously described.

For instance, at this point, the information handling system 102 may take advantage of this optimization, and start opening the primary AL_PA for traffic destined to this port. Other methods of determining alias AL_PAs are also contemplated by the present invention, the previous discussion being an example thereof.

In exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

Although the invention has been described with a certain degree of particularity, it should be recognized that elements thereof may be altered by persons skilled in the art without departing from the spirit and scope of the invention. One of the embodiments of the invention can be implemented as sets of instructions resident in the memory of one or more information handling systems, which may include memory for storing a program of instructions and a processor for performing the program of instruction, wherein the program of instructions configures the processor and information handling system. Until required by the information handling system, the set of instructions may be stored in another readable memory device, for example in a hard disk drive or in a removable medium such as an optical disc for utilization in a CD-ROM drive and/or digital video disc (DVD) drive, a compact disc such as a compact disc-rewriteable (CD-RW), compact disc-recordable and erasable; a floppy disk for utilization in a floppy disk drive; a floppy/optical disc for utilization in a floppy/optical drive; a memory card such as a memory stick, personal computer memory card for utilization in a personal computer card slot, and the like. Further, the set of instructions can be stored in the memory of an information handling system and transmitted over a local area network or a wide area network, such as the Internet, when desired by the user.

Additionally, the instructions may be transmitted over a network in the form of an applet that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

It is believed that the system and method of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method of performing a full duplex open in a fibre channel network having an initiator and a bridge, comprising:

initiating an open by the initiator with the bridge, the bridge having a primary arbitrated loop physical address and an alias arbitrated loop physical address, the alias arbitrated loop physical address representing a target device communicatively coupled to the bridge, wherein the open is initiated utilizing the primary arbitrated loop physical address; and communicating with the initiator by the target device; wherein the primary arbitrated loop physical address has a target device associated with the address; wherein communicating with a secondary target device is performed during tenancy of the open initiated by the initiator utilizing the primary arbitrated loop physical address so that the host may communicate with the target device and the secondary target device; and wherein having the full duplex open initiated using the primary arbitrated loop physical address allows the target devices to better utilize the full duplex nature of the fibre channel network.

2. The method as described in claim 1, wherein the fibre channel network is an arbitrated loop.

3. The method as described in claim 1, wherein the open of the primary arbitrated loop physical address enables full duplex communication with all the physical addresses of the bridge.

4. The method as described in claim 1, wherein communications with the initiator by the target devices are performed without rearbitrating for the fibre channel network.

5. The method as described in claim 1, further comprising determining presence of alias arbitrated loop physical addresses.

6. The method as described in claim 5, wherein the determining includes identifying a mismatch between traffic received having a source identifier (S_ID) which does not match the physical address of the open associated with the traffic.

7. The method as described in claim 5, wherein the determination of the alias arbitrated loop physical address is utilized so that subsequent opens for the alias physical address are performed utilizing a primary physical address.

8. A system, comprising:

a host suitable for communicating utilizing fibre channel; and a bridge having a primary arbitrated loop physical address corresponding to a first device and at least one alias arbitrated loop physical address which corresponds to a second device, the bridge communicatively coupled to the host through an arbitrated loop fibre channel network wherein a full duplex open is initiated by the host with the bridge utilizing the primary arbitrated loop physical address; wherein the second device communicates with the host during tenancy of the open initiated by the host utilizing the primary arbitrated loop physical address of the first device; and wherein having the full duplex open initiated using the primary arbitrated loop physical address allows the target devices to better utilize the full duplex nature of the fibre channel network.

9. The system as described in claim 8, wherein communicating is performed without rearbitrating for the fibre channel arbitrated loop.

10. The system as described in claim 8, wherein the open of the primary arbitrated loop physical address enables full duplex communication with all the physical addresses of the bridge.

11. The system as described in claim 8, further comprising determining presence of alias arbitrated loop physical addresses.

12. The system as described in claim 11, wherein determining includes identifying a mismatch between traffic received having a source identifier (S_ID) which does not match the arbitrated loop physical address of the open associated with the traffic.

13. The system as described in claim 11, wherein the determination of the alias arbitrated loop physical address is utilized so that subsequent opens for the alias arbitrated loop physical address are performed utilizing a primary arbitrated loop physical address.

14. A method of performing a full duplex open in a fibre channel arbitrated loop having an initiator and a bridge, comprising:

initiating an open by the initiator with the bridge, the bridge having a primary arbitrated loop physical address and at least two alias arbitrated loop physical addresses, the alias arbitrated loop physical addresses representing at least two target devices communicatively coupled to the bridge, wherein the open is initiated utilizing the primary arbitrated loop physical address; and communicating with the initiator by the at least two target devices; wherein communicating with the initiator by the at least two target devices is performed during tenancy of the open initiated by the Initiator utilizing the primary arbitrated loop physical address; and wherein having the full duplex open initiated using the primary arbitrated loop physical address allows the target devices to better utilize the full duplex nature of the fibre channel network.

15. The method as described in claim 14, wherein communicating with the initiator by the at least two target devices is performed without rearbitrating for the fibre channel arbitrated loop.

16. The method as described in claim 14, wherein the open of the primary physical address enables full duplex communication with all the physical addresses of the bridge.

17. The method as described in claim 14, further comprising determining presence of alias arbitrated loop physical addresses.

18. The method as described in claim 17, wherein the determining includes identifying a mismatch between traffic received having a source identifier (S_ID) which does not match the arbitrated loop physical address of the open associated with the traffic.

19. The method as described in claim 14, wherein the determination of the alias arbitrated loop physical address is utilized so that subsequent opens for the alias arbitrated loop physical address are performed utilizing a primary arbitrated loop physical address.

* * * * *